United States Patent
Hamlin et al.

(10) Patent No.: US 11,698,983 B2
(45) Date of Patent: Jul. 11, 2023

(54) PERMISSION MANAGEMENT OF CLOUD-BASED DOCUMENTS

(71) Applicant: salesforce.com, inc., San Francisco, CA (US)

(72) Inventors: Drew Hamlin, San Francisco, CA (US); Andrew Chung, San Francisco, CA (US); William Joseph Flynn, III, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 204 days.

(21) Appl. No.: 16/952,451

(22) Filed: Nov. 19, 2020

(65) Prior Publication Data
US 2021/0073398 A1    Mar. 11, 2021

Related U.S. Application Data

(63) Continuation of application No. 15/637,762, filed on Jun. 29, 2017, now Pat. No. 10,860,729.

(51) Int. Cl.
*H04L 29/06* (2006.01)
*G06F 21/60* (2013.01)
(Continued)

(52) U.S. Cl.
CPC ............ *G06F 21/604* (2013.01); *G06F 16/93* (2019.01); *G06F 21/6218* (2013.01);
(Continued)

(58) Field of Classification Search
CPC ..... H04L 67/02; H04L 63/101; H04L 63/102; H04L 63/08; G06F 16/93; G06F 21/604; G06F 21/6218; G06F 21/31
See application file for complete search history.

(56) References Cited

U.S. PATENT DOCUMENTS

| 2003/0216143 A1 | 11/2003 | Roese et al. |
| 2013/0246901 A1* | 9/2013 | Massand ............... G06F 40/197 715/229 |

(Continued)

FOREIGN PATENT DOCUMENTS

| JP | 2014-532209 A | 12/2014 |
| JP | 2015-011477 A | 1/2015 |

(Continued)

OTHER PUBLICATIONS

Presentation Mode in Evernote (https://www.youtube.com/watch?v=RImpdq3wmX8), Published on May 14, 2014.
(Continued)

*Primary Examiner* — Tri M Tran
(74) *Attorney, Agent, or Firm* — Sterne, Kessler, Goldstein & Fox P.L.L.C.

(57) ABSTRACT

Disclosed herein are system, method, and computer program product embodiments for managing cloud-based document permissions. In an embodiment, a document generation system may generate and/or store a cloud-based document. The document generation system may also generate links to the cloud-based document. The generated links may be associated with different permissions. For example, a first link may allow a first client device accessing the first link to edit the document while a second link may allow a second client device accessing the second link to only view the document. Other permissions may also include generating distinct graphical user interfaces (GUIs) associated with different links. The GUIs may accept input messages and/or comments in a chat panel. The document generation system may facilitate the delivery of these input messages to other client device with document access.

20 Claims, 7 Drawing Sheets

(51) Int. Cl.
*H04L 9/40* (2022.01)
*G06F 21/62* (2013.01)
*G06F 16/93* (2019.01)
*G06F 21/31* (2013.01)
*H04L 67/02* (2022.01)

(52) U.S. Cl.
CPC ............ *H04L 63/101* (2013.01); *G06F 21/31* (2013.01); *H04L 63/08* (2013.01); *H04L 63/102* (2013.01); *H04L 67/02* (2013.01)

(56) References Cited

U.S. PATENT DOCUMENTS

| | | |
|---|---|---|
| 2013/0305385 A1 | 11/2013 | Korteweg et al. |
| 2014/0067865 A1 | 3/2014 | Kirigin |
| 2015/0039759 A1 | 2/2015 | Kuo et al. |
| 2018/0006982 A1* | 1/2018 | Costello ................ H04L 63/105 |
| 2019/0005251 A1 | 1/2019 | Hamlin et al. |

FOREIGN PATENT DOCUMENTS

| | | |
|---|---|---|
| JP | 2015-028744 A | 2/2015 |
| WO | WO 2013/036488 A2 | 2/2015 |

OTHER PUBLICATIONS

Office 365—Wikipedia NPL 2016; obtained from Wikipedia on Dec. 14, 2016.
Slidegenius—NPL 2014; obtained on Dec. 14 from https:/www.slidegenius.com/blog/powerpoint-permissions/ (Year: 2014).
SharePointMaven—NPL 2016; obtained on Dec. 18 from https://sharepointmaven.com/manage-links-sharepoint/ (Year: 2016).

\* cited by examiner

PERMISSION MANAGEMENT OF CLOUD-BASED DOCUMENTS

CROSS-REFERENCE TO RELATED APPLICATIONS

This application is a continuation of U.S. patent application Ser. No. 15/637,762, filed Jun. 29, 2017, and is related to U.S. patent application Ser. No. 15/637,729, filed Jun. 29, 2017, entitled "Presentation Collaboration with Various Electronic Devices", to U.S. patent application Ser. No. 15/637,096, filed Jun. 29, 2017, entitled "Color Theme Maintenance for Presentations", to U.S. patent application Ser. No. 15/637,077, filed Jun. 29, 2017, now issued as U.S. Pat. No. 10,592,597, entitled "Smart Defaults Based On Previous Settings For Presentation Slides", and to U.S. patent application Ser. No. 15/637,717, filed Jun. 29, 2017, entitled "Automatic Layout Engine" all of which are hereby incorporated by reference in their entireties.

BACKGROUND

As document creation evolves, writers, editors, and programmers sometimes collaborate with other contributors. To facilitate collaboration between many contributors to the creation of a document, cloud-based document generation has become a common structure, allowing many users to access and/or edit a document. In some instances, cloud-based documents may reside in a repository, allowing one user to access and/or edit the document at a time. For example, the cloud-based document may implement a "check-out" featuring, allowing only one editor to make changes at a time. In other instances, some cloud-based documents may allow real-time document editing.

As collaboration evolves, however, document owners may wish to segregate users and grant different types of access to different individuals. A challenge facing this segregation, however, is that the different permissions must be intuitive for the document owner to grant as well as intuitive for users to utilize.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
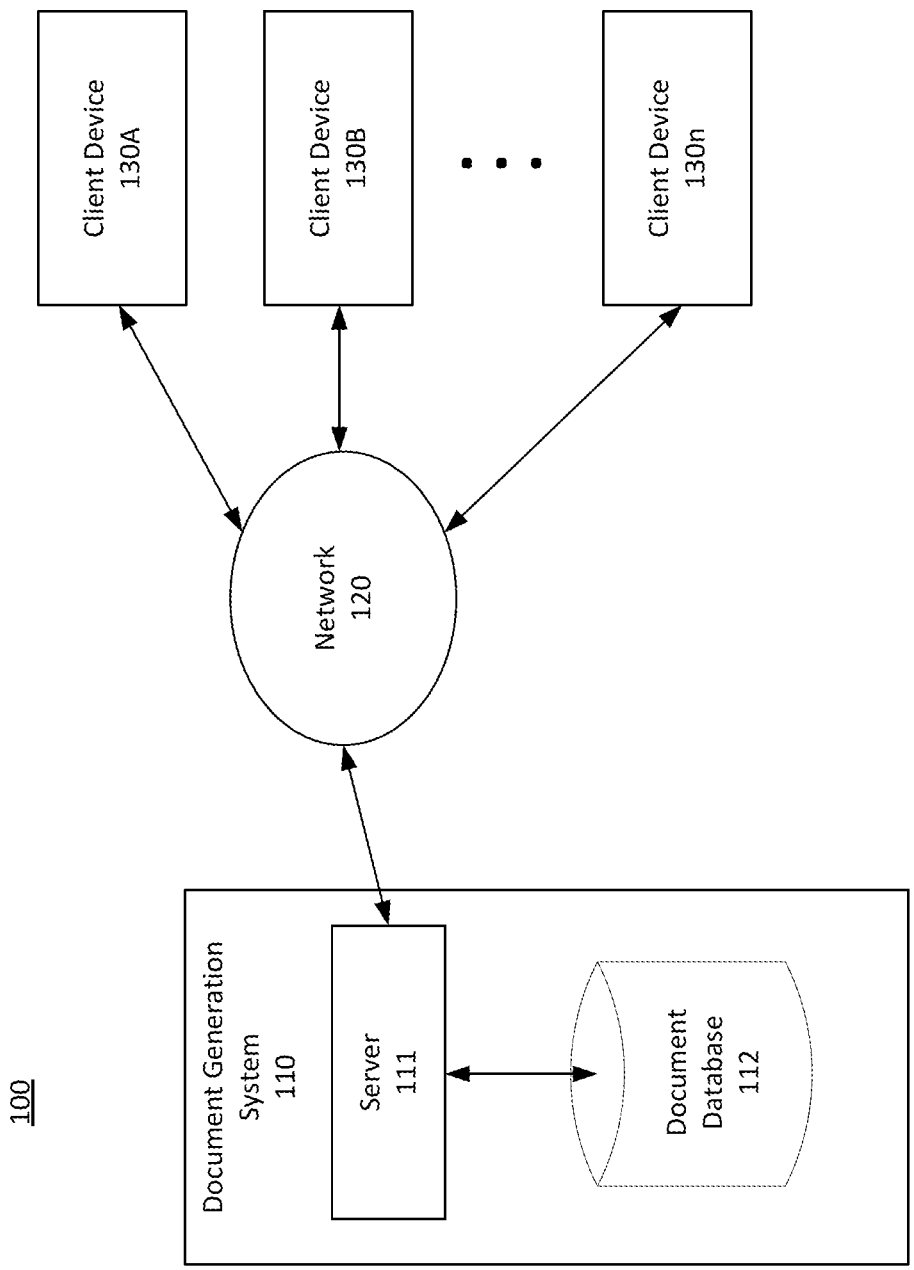
FIG. 1 is a block diagram of a document permission management system, according to some embodiments.

Provided herein are system, apparatus, device, method and/or computer program product embodiments, and/or combinations and sub-combinations thereof, for managing permissions associated with cloud-based documents.

The systems and methods described herein may manage, assign, and/or transmit permission links associated with cloud-based documents. In an embodiment, a document generation system may generate and/or maintain a document. The document may be a computer-readable document capable of being displayed on a computer screen and/or a monitor. For example, the document may comprise text, an image, a spreadsheet and/or table, a presentation, a slideshow, computer program code, and/or an internet browser code. In an embodiment, the document may include transitory information such as, for example, an audio and/or video file. The document generation system may generate a document at the request of a user and/or a client device. The document generation system may also store the document in a repository internal to the document generation system.

In an embodiment, the document generation system may maintain permissions associated with a generated document. The document generation system may maintain permission based on different links associated with the document. A link may be, for example, a Uniform Resource Locator (URL), Uniform Resource Identifier (URI), and/or an embedded web object granting a client device access to a server and/or database maintaining a document. The document generation system may generate unique links to a document and may transmit the unique links to client devices. Each link may be associated with one or more unique identification and unique permissions. If a client device utilizes the link to access the associated document, the client device may receive the permissions associated with the utilized link. This link structure may allow the document generation system to grant different document permissions to different client devices.

In an embodiment, a link may include a unique identification. The document generation system may format the link to include the unique identification, by, for example, generating a unique textual URL. The document generation system may transmit this link to a client device. In an embodiment, the document generation system may maintain an index of unique identifications and permissions associated with the unique link identifications. The permissions may include rights associated with a cloud-based document. For example, the permissions may include allowing a client device that accesses the link to edit the associated cloud-based document. In an embodiment, the link may not allow editing of the document but instead may allow a client device to view the document. In an embodiment, the link may allow commenting and/or interacting with chat features associated with the document. In an embodiment, the commenting and/or chat interaction may be coupled with the editor and/or viewer permission.

In an embodiment, client devices may share the link. Because the document generation system may associate permissions with a link, the link may be shared among different client devices, granting other client devices the same associated permissions. For example, the link may be embedded in a webpage or sent via an electronic message, allowing multiple client devices to access the link. In an embodiment, a shared link may still maintain a unique identification associated with the link. If multiple client devices access the document using the same link, the document generation system may still distinguish each client device using a unique identifier, such as, for example, an Internet Protocol (IP) address associated with the client device. In an embodiment, although the document generation system may distinguish each client device, the document generation system may still grant the same permissions to the client devices that access the document with the same link.

In an embodiment, the document generation system may alter the permissions associated with a link. The document generation system may revoke permissions and/or grant other permissions, enabling further interactions with a document. This embodiment may allow for revocation of permissions to links that may be compromised and/or links that have become unsecure. This embodiment may also allow for enabling features for a client device that has already received a link.

In an embodiment, a graphical user interface (GUI) display may be a permission associated with a link. For example, when a client device accesses a link, the document generation system may generate a GUI, allowing the client device to interact with the document associated with the link. The client device may display the GUI and/or send commands to the document generation system using the GUI. In an embodiment, the GUI may display the link used to access the document, a document interface for interaction with the document, and/or a chat panel enabling chat features.

In an embodiment, the GUI may display different elements depending on the permissions associated with the link. For example, a client device accessing a link with editor permissions may view a different GUI than a client device accessing a link with viewer permissions. In an embodiment, a GUI associated with an editor permission may include a document editing interface, an editor chat panel, and/or a viewer chat panel. In an embodiment, a GUI associated with a viewer permission may include a document viewing interface and/or a viewer chat panel.

A chat panel may be one or more sections of a GUI and/or may share the GUI's association with a document. The document generation system may instantiate the chat panel, receive comments and/or chat messages from a client device via a chat panel, and/or maintain the comments and/or chat messages in a repository. The client device may utilize the GUI to transmit comments and/or chat messages to the document generation system. In an embodiment, the document generation system may associate the link used to access the document with a comment and/or chat message received at a chat panel.

In an embodiment, the document generation system may generate a document reference associated with the comment and/or chat message. The document generation system may identify a parameter related to the document and associate the parameter with the comment and/or chat message. For example, the document generation system may generate a presentation, including several presentation slides, and a link associated with the presentation. The document generation system may transmit the link to a client device, allowing the client device to access a GUI and interact with the slides of the presentation. If the document generation system receives a comment from a client device while a slide is displayed on the GUI, the document generation system may associate the slide number of the displayed slide with the received comment. In an embodiment where the document is a text document including one or more pages, the document generation system may associate a page number of the displayed page with the received comment.

In an embodiment, the document generation system may receive a comment associated with a document from a first client device. The first client device may interact with the document via a first GUI displayed on the first client device. The document generation system may store the received comment and/or associate a document reference to the comment. The document generation system may then receive a request to access the document from a second client device. The second client device may use the same link as the first client device to access the document or may use a different link generated by the document generation system. The document generation system may transmit a second GUI to the second client device. The second GUI may or may not display the same GUI components as the first GUI. Using the second GUI, the second client device may interact with the document and view the comment received from the first client device.

In an embodiment, if the document is a presentation, the comment may include a slide number reference. When the second client device accesses the presentation via the link, the second client device may interact with the slides of the presentation via the second GUI. When the second client device views the slide associated with the comment, the document generation system may transmit the comment to the second client device. The second GUI may display the comment when the second client device accesses the slide associated with the comment. In an embodiment, the second GUI may display the comment in a chat panel. In an embodiment, the second GUI may not display the comment when the slide associated with the comment is not displayed on the second GUI.

In an embodiment, the chat panel associated with the second GUI may utilize a notification feature to alert users of new comments and/or chat messages. For example, after a second client device accesses a document with a comment and/or chat message, the document generation system may transmit to the second GUI a notification indicating that a comment and/or chat message is associated with the document that the second client device has not previously displayed. This notification may include the comment, chat message, first client device identification, and/or document reference indicating a portion of the document to which the comment and/or chat message is applicable.

These features will now be discussed with respect to the corresponding figures.

FIG. 1 is a block diagram of a document permission management system 100, according to some embodiments. In an embodiment, document permission management system 100 may generate a cloud-based document and/or manage links and permissions associated with the cloud-based document. Document permission management system 100 may include document generation system 110, network 120, and one or more client devices 130A, 130B, . . . , 130n.

In an embodiment, document generation system 110 may generate, store, and/or maintain cloud-based documents. Document generation system 110 may also generate links associated with the cloud-based documents. Document generation system 110 may also assign permissions to the links and/or maintain a record of the links and associated permissions. Document generation system 110 may include a server 111 and a document database 112.

In an embodiment, server 111 may comprise one or more processors, memory, routers, modems, antennae, and/or circuitry configured to interface with document database 112, network 120, and/or a client device 130. Server 111 may communicate with a client device 130 using network 120 and/or a network protocol. Network 120 may comprise a network capable of transmitting information either in a wired or wireless manner and may be, for example, the Internet, a Local Area Network, and/or a Wide Area Network. The network protocol may be, for example, a hypertext transfer protocol (HTTP), a TCP/IP protocol, Ethernet, or an asynchronous transfer mode. Server 111 may transmit and/or receive information to a client device 130. Server 111 may process the information sent and/or received from a client device 130. Server 111 may retrieve information, such as, for example, document properties from document database 112 and/or transmit this information to a client device 130. Server 111 may receive document interactions and/or commands from a client device 130.

In an embodiment, server 111 may be configured to generate a cloud-based document. The cloud-based document may comprise text, an image, a spreadsheet and/or table, a presentation, a slideshow, computer program code, and/or an internet browser code. In an embodiment, the cloud-based document may include transitory information such as, for example, an audio and/or video file. Server 111 may interact with document database 112 using a database management system and/or store a generated cloud-based document in document database 112. Document database 112 may comprise tables, records, indexes, and/or other memory configured to store cloud-based documents and/or records pertaining to permissions associated with the cloud-based documents.

In an embodiment, server 111 may instantiate a cloud-based document based on a command received from a client device 130. Client device 130 may be a computing platform, such as, but not limited to, a smartphone, tablet computer, laptop computer, desktop computer, web browser, and/or other computing device configured to connect to network 120 to communicate with document generation system 110. In an embodiment, server 111 may receive and/or store a document generated at a client device 130. Server 111 may associate client device ownership of the document based on a property of the client device 130 that requested generation of the document. For example, client device 130A may request generation of a document. Client device 130A may provide account information and/or log-in information to document generation system 110. In response to receiving account information and/or log-in information, document generation system 110 may allow client device 130A to generate a document. In an embodiment, server 111 may associate ownership of the document to client device 130A and/or an account associated with client device 130A. In an embodiment, a user may utilize a different client device 130 to access document generation system 110 and may still access owned documents based on providing the same account information using another client device 130. In an embodiment, server 111 may store generated documents in document database 112 and/or maintain a record of ownership of the generated documents.

In an embodiment, the client device 130 and/or account that is deemed the owner of a document may specify permissions associated with the document. An owner may utilize a client device 130 to interact with document generation system 110 to manage permissions associated with the owed document. In an embodiment, document generation system 110 may receive commands to generate one or more links to the document and/or transmit the links to a client device 130. A link may be, for example, a Uniform Resource Locator (URL), Uniform Resource Identifier (URI), and/or an embedded web object granting a client device 130 access to a document stored in document generation system 110.

Document generation system 110 may generate unique links to a document and may transmit the unique links to one or more client devices 130A, 130B, . . . , 130n. Each link may be associated with one or more unique identifications and/or unique permissions. If a client device 130 utilizes the link to access the associated document, the client device 130 may receive the permissions associated with the utilized link from document generation system 110. This link structure may allow document generation system 110 to grant different document permissions to different client devices 130.

In an embodiment, a link may include a unique identification. Document generation system 110 may format the link to include the unique identification, by, for example, generating a unique textual URL. Document generation system 110 may transmit this link to a client device 130. In an embodiment, client device 130A may send a command to document generation system 110, causing document generation system 110 to send a link to client device 130B.

In an embodiment, document generation system 110 may maintain an index of unique link identifications and/or permissions associated with the unique identifications. Document generation system 110 may store this index in document database 112 and/or in a separate memory storage device.

The associated permissions may include rights associated with a cloud-based document. For example, permissions may include allowing a client device 130 that accesses the link to edit the associated cloud-based document. In an embodiment, the link may not allow editing of the document but instead may allow a client device 130 to view the document. In an embodiment, the link may allow commenting and/or interacting with chat features associated with the document. In an embodiment, the commenting and/or chat interaction may be coupled with the editor and/or viewer permission. Document permissions and chat features will be further discussed with reference to FIGS. 3A-3B and 4A-4B.

In an embodiment, a client device 130 with access to a link may share the link. Because document generation system 110 may associate permissions with a link, the link may be shared among different client devices 130, granting other client devices 130 the same associated permissions. In an embodiment, client device 130A may receive a link from document generation system 110. Client device 130A may then transmit the link to one or more other client devices 130. For example, the link may be embedded in a webpage or sent via an electronic message, allowing multiple client devices 130 to access the link.

In an embodiment, a shared link may still maintain a unique identification associated with the link. If multiple client devices 130 access the document using the same link, document generation system 110 may still distinguish each client device 130 using a unique identifier, such as, for example, an Internet Protocol (IP) address associated with the client device 130, a phone number, Global Positioning System (GPS) information, account information, and/or other information capable of distinguishing client devices 130. In an embodiment, although document generation system 110 may distinguish each client device 130, document generation system 110 may still grant the same permissions to the client devices 130 that access the document with the same link.

In an embodiment, document generation system 110 may alter the permissions associated with a link. Document generation system 110 may revoke permissions and/or grant other permissions, enabling further interactions with a document. This embodiment may allow for revocation of permissions to links that may be compromised and/or links that have become unsecure. This embodiment may also allow for enabling features for a client device 130 that has already received a link.

In an embodiment, a graphical user interface (GUI) display may be a permission associated with a link. For example, when a client device 130 accesses a link, document generation system 110 may generate a GUI, allowing the client device to interact with the document associated with the link. A client device 130 may display the GUI and/or send commands to the document generation system using the GUI. In an embodiment, the GUI may display the link used to access the document, a document interface for interaction with the document, and/or a chat panel enabling chat features. The GUI display feature will be discussed in further detail with reference to FIGS. 3A-3B and 4A-4B.

Figure 2:
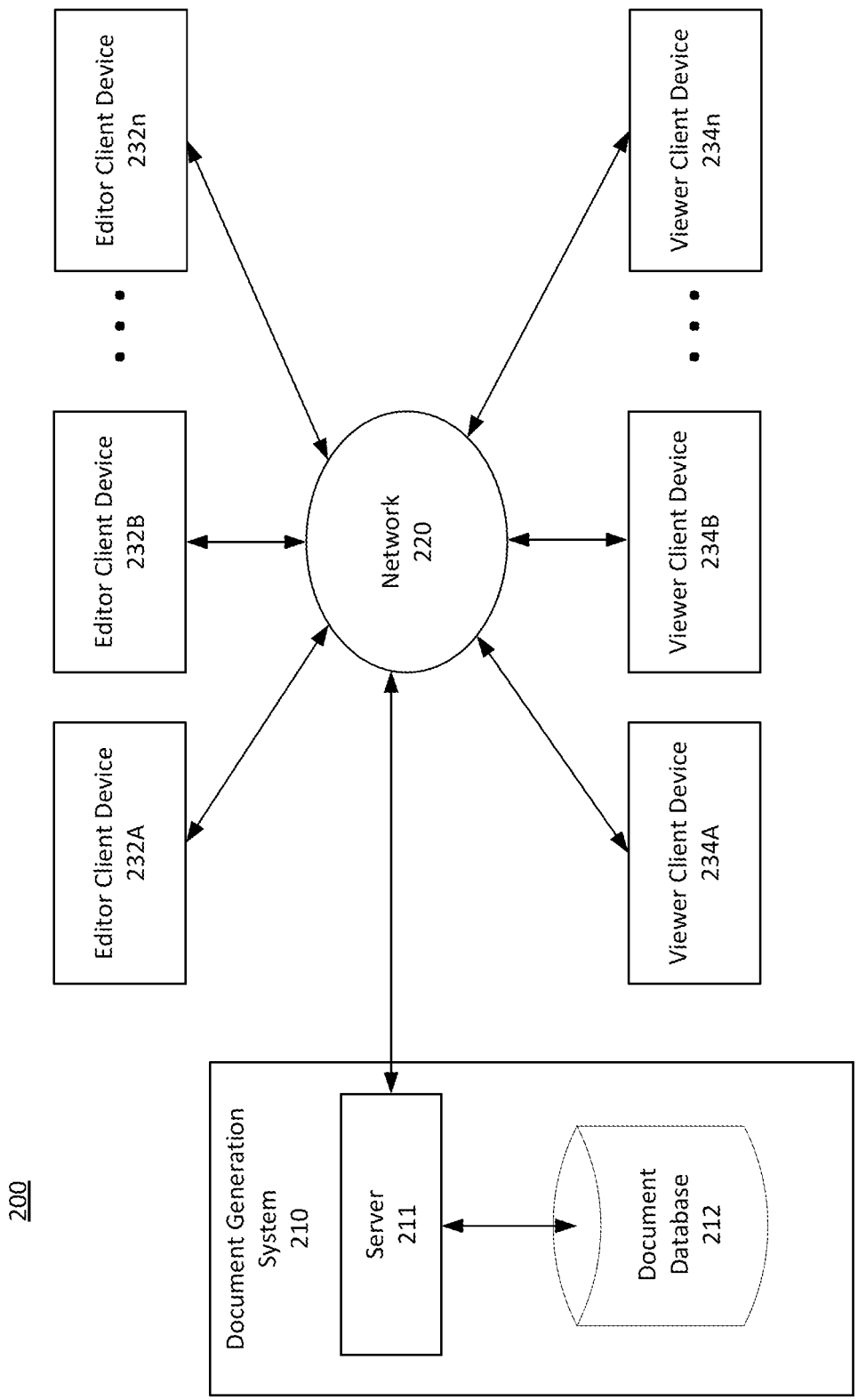
FIG. 2 is a block diagram of a document permission management system highlighting distinct permissions, according to some embodiments.

FIG. 2 is a block diagram of a document permission management system 200 highlighting distinct permissions, according to some embodiments. In an embodiment, document permission management system 200 may include a document generation system 210, network 220, and client devices categorized into two categories: editor client devices 232A, 232B, . . . , 232n and viewer client devices 234A, 234B, . . . , 234n. Document generation system 210 may comprise components similar to document generation system 110 described with reference to FIG. 1. These components may include server 211 and document database 212, which may be configured to operate in a similar manner to server 111 and document database 112 as described with reference to FIG. 1. Network 220 may comprise components similar to network 120 also described with reference to FIG. 1.

Editor client device 232A, 232B, . . . , 232n and/or viewer client device 234A, 234B, 234n may be a computing platform, such as, but not limited to, a smartphone, tablet computer, laptop computer, desktop computer, web browser, and/or other computing device configured connect to network 220 to communicate with document generation system 210. In an embodiment, editor client device 232A may comprise different hardware from editor client device 232B. In an embodiment, editor client device 232A may comprise the same hardware as editor client device 232B. In an embodiment, viewer client device 234A may comprise different hardware from viewer client device 234B. In an embodiment, viewer client device 234A may comprise the same hardware as viewer client device 234B. In an embodiment, editor client device 232A may comprise different hardware from viewer client device 234A. In an embodiment, editor client device 232A may comprise the same hardware as viewer client device 234A.

In an embodiment, editor client device 232A may differ from editor client device 232B based on the link received from document generation system 210. Document generation system 210 may transmit a first link to editor client device 232A and a second link to editor client device 232B. Document generation system 210 may associate different permissions to the first and the second link. Document generation system 210 may assign permissions received from an owner of a document. In an embodiment, the first and second link may be associated with an editor permission, allowing an editor client device 232 that interacts with either the first or second link to edit the associated document. In an embodiment, permissions associated with the first link and the second link may be the same.

In an embodiment, permissions associated with the first link may differ from the permissions associated with the second link. For example, when editor client device 232A utilizes the first link to interact with the document, document generation system 210 may allow editor client device 232A to edit a portion and/or subset of the document. In contrast, when editor client device 232B utilizes the second link to interact with the document, document generation system 210 may allow editor client device 232B to edit the entirety of the document. Editor client device 232B may gain editor rights to edit the full document while editor client device 232A may gain editor rights to edit a portion of the document. For example, document generation system 210 may restrict editor client device 232A to certain pages of a text document, certain slides of a presentation, certain segments of software code, certain portions of an audio file, and/or certain portions of a video file.

In an embodiment, editor client device 232A may be able to view a viewer chat panel on a GUI display (as described with reference to FIG. 4A) while editor client device 232B may not view the viewer chat panel. In an embodiment, editor client device 232A may be able to view an editor chat panel on the GUI display while editor client device 232B may not view the editor chat panel. Because document generation system 210 manages permissions related to links sent to editor client devices 232, document generation system 210 may customize the permissions associated with each link. This customization may allow shared editing privileges among editor client devices 232 but may apply specific editing restrictions to certain editor client devices 232. Customizable link permissions may allow for greater flexibility in managing cloud-based document access.

Links sent to viewer client devices 234 may also include customizable permissions. In an embodiment, document generation system 210 may transmit a first link to viewer client device 234A and a second link to viewer client device 234B. The first and second link may be associated with a viewer permission, allowing a viewer client device 234 that interacts with either the first or second link to view the associated document. In an embodiment, permissions associated with the first link and the second link may be the same.

In an embodiment, permissions associated with the first link may differ from the permissions associated with the second link. For example, when viewer client device 234A utilizes the first link to interact with the document, document generation system 210 may allow viewer client device 234A to view a portion and/or subset of the document. In contrast, when viewer client device 234B utilizes the second link to interact with the document, document generation system 210 may allow viewer client device 234B to view the entirety of the document. Viewer client device 234B may gain viewer rights to view the full document while viewer client device 234A may gain viewer rights to view a portion of the document. For example, document generation system 210 may restrict viewer client device 234A to certain pages of a text document, certain slides of a presentation, certain segments of software code, certain portions of an audio file, and/or certain portions of a video file.

In an embodiment, viewer client device 234A may be able to view a viewer chat panel on a GUI display (as described with reference to FIG. 4B) while viewer client device 234B may not view the viewer chat panel. Because document generation system 210 manages permissions related to links sent to viewer client devices 234, document generation system 210 may customize the permissions associated with each link. This customization may allow shared viewing privileges among viewer client devices 234 but may apply specific viewing restrictions to certain viewer client devices 234.

In an embodiment, document generation system 210 may restrict the time during which a viewer client device 234 may view the document. For example, document generation system 210 may specify windows of time to allow and/or disallow access to a document. For example, a link sent to viewer client device 234A may allow viewer client device 234A to access the document between 3:00 PM and 4:00 PM. In an embodiment, this window of time may correspond to a presentation of the document, such as, for example, a slideshow presentation. In an embodiment, document generation system 210 may impose a time limit restriction on the link access to the document. For example, viewer client device 234A may be allowed to view the document for one hour starting from when viewer client device 234A first utilizes the link.

In an embodiment, document generation system 210 may place location restrictions on links sent to viewer client devices 234. For example, although viewer client device 234A may have access to a link, document generation system 210 may require that viewer client device 234A be located in a certain geographical location before providing access to the document. In an embodiment, document generation system 210 may require that viewer client device 234A provide a Global Positioning System (GPS) coordinate before granting access to the document. In an embodiment, document generation system 210 may determine a location of viewer client device 234A based on an IP address of viewer client device 234A.

The permissions described with reference to viewer client devices 234 may also be applied to editor client devices 232.

In an embodiment, an editor client device 232 may differ from a viewer client device 234 based on the link received from document generation system 210. For example, editor client device 232A may receive a first link from document generation system 210 with editor permissions associated with the first link. Viewer client device 234A may receive a second link from document generation system 210 with viewer permissions associated with the second link. The first and second link may be associated with the same document. In an embodiment, document generation system 210 may convert the permission associated with the first link from an editor permission to a viewer permission or from a viewer permission to an editor permission. Although an editor client device 232 may already maintain possession of the link, based on the revocation of editor permissions, editor client device 232 may be converted to a viewer client device 234. Document generation system 210 may alter the permissions associated with the link as a result of potential breach of security. In an embodiment, document generation system 210 may convert the permission associated with the second link from a viewer permission to an editor permission to easily and quickly grant editor access to a viewer client device 234, converting the viewer client device 234 into an editor client device 232.

In an embodiment, even after an editor link has been received at an editor client device 232, document generation system 210 may alter the permissions associated with the link, granting and/or revoking permissions. Document generation system 210 may also perform this customization with a viewer link that has been received at a viewer client device 234.

In an embodiment, document generation system 210 may transmit a first link to editor client device 232A and a second link to viewer client device 234A. The first and second link may correspond to the same cloud-based document stored in document generation system 210. While viewer client device 234A may view the document, editor client device 232A may continue to make edits to the document. In an embodiment, document generation system 210 may receive the edits from editor client device 232A, update the stored cloud-based document, and/or transmit the edit to viewer client device 234A. In an embodiment, these edits may be sent to viewer client device 234A in real-time or in near real-time. In an embodiment, viewer client device 234A need not refresh the document or re-request the document to view the updates. Similarly, another editor client device 232B may also access the document and view edits in real-time. In another embodiment, document generation system 210 may require viewer client device 234A and/or editor client device 232B to request updates before sending updates.

In an embodiment, the document may be a presentation. Using an editor link, editor client device 232A may edit the presentation to varying stages of completion. In an embodiment, editor client device 232A may also own the presentation, allowing editor client device 232A to dictate the permissions related to the presentation. Editor client device 232A may send a command to document generation system 210 to generate another editor link for editor client device 232B. Document generation system 210 may generate the link and send the link to editor client device 232B. In an embodiment, document generation system 210 may generate the link for editor client device 232A. Editor client device 232A may then send the link to editor client device 232B. After receiving the editor link, editor client device 232B may edit the presentation. In an embodiment, editor client device 232B may access the presentation while editor client device 232A is also accessing the presentation. This embodiment may allow editor client device 232A and 232B to edit the presentation simultaneously and in real time.

In an embodiment, editor client device 232A may send a command to document generation system 210 to generate a viewer link for viewer client device 234A. Document generation system 210 may generate the link and send the link to viewer client device 234A. In an embodiment, document generation system 210 may generate the link for editor client device 232A. Editor client device 232A may then send the link to viewer client device 234A. After receiving the viewer link, viewer client device 234A may view the presentation even while editor client device 232A and/or 232B are still editing the presentation. In a presentation context, if a change is needed while the presentation is being delivered, editor client device 232A and/or 232B may edit the presentation quickly, without the need to interrupt the flow of the given presentation and/or without the need to re-deliver an updated presentation file. In an embodiment, editor client device 232A and/or the owner of the presentation may dictate the portions of the presentation seen by viewer client device 234A. The ability to control portions of a document viewed by a viewer client device 234 may also apply to other document types and may also be changeable in real-time by the document owner.

In an embodiment, this configuration allows editor client device 232A and/or a document owner to quickly generate a viewer link for a presentation. A document owner may transmit this link to efficiently deliver presentation slides to one or more viewer client devices 234. In an embodiment, because the document owner and/or editor client device 232A may also manipulate the portions of the presentation seen by viewer client devices 234, the document owner and/or editor client device 232A may utilize the presentation slides as a customizable visualization tool. This configuration may allow for cross-platform presentations using viewer links. In an embodiment, this configuration may remove the necessity for a document owner to export and/or send a presentation file. In an embodiment, this configuration may also remove the necessity for a document owner to share the document owner's computer screen, which may display private information other than the presentation. The document link configuration may allow for faster deployment of documents such as, for example, presentations. These permissions and control over viewer document interaction may also be applicable to the other aforementioned document types.

Figure 3A:
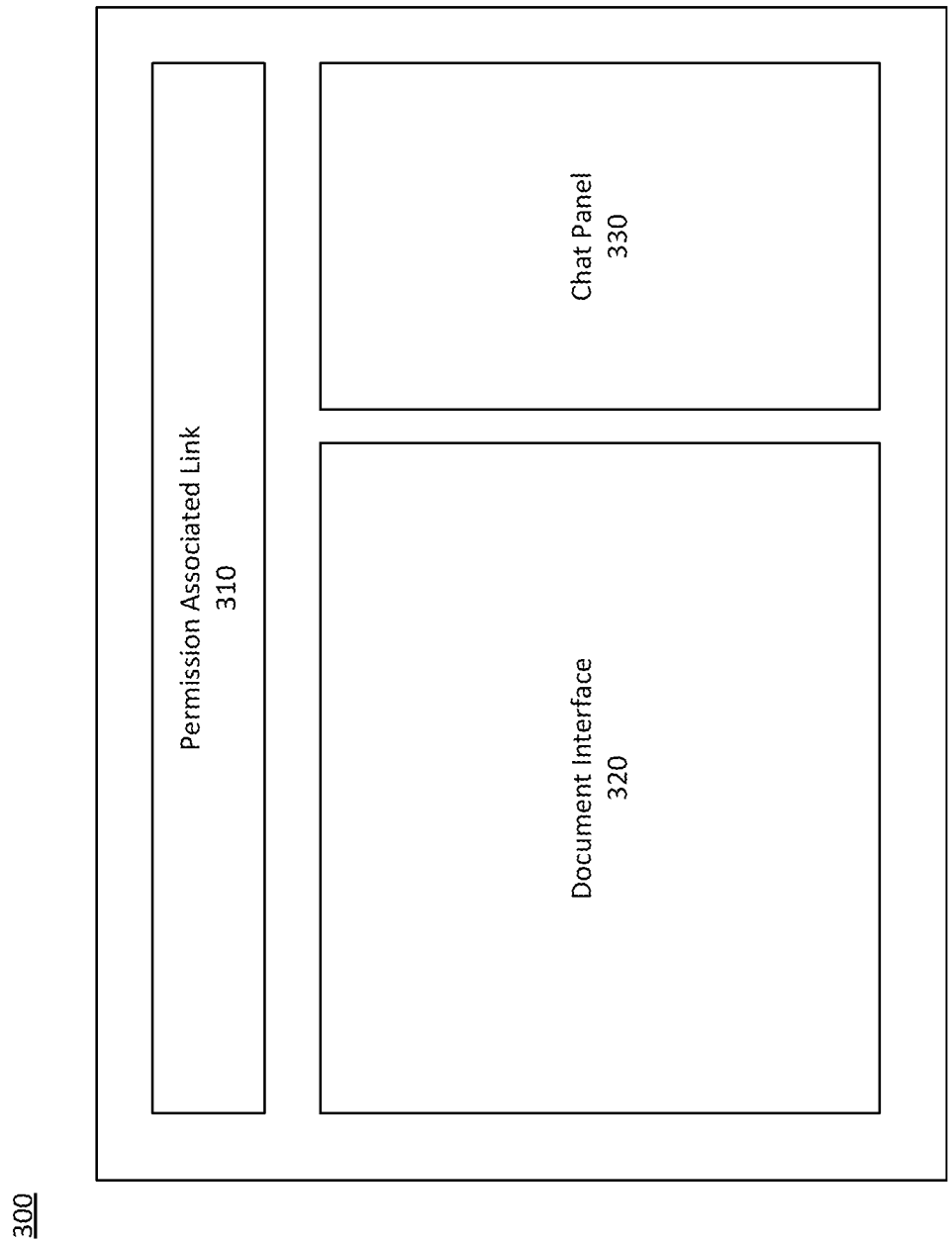
FIG. 3A is a screen display of a document interaction graphical user interface, according to some embodiments.

FIG. 3A is a screen display of a document interaction graphical user interface (GUI) 300, according to some embodiments. A document generation system may instantiate document interaction GUI 300 and/or provide access to document interaction GUI 300 to a client device. Document interaction GUI 300 may be developed using an application programming interface (API). In an embodiment, the document generation system may transmit permission associated link 310 to a client device, allowing the client device to access a document. Document interaction GUI 300 may be displayed on the client device, allowing the client device to interact with the document.

In an embodiment, document interaction GUI 300 may comprise a permission associated link 310, a document interface 320, and/or a chat panel 330. A client device utilizing permission associated link 310 may access the document using, for example, a web browser. In an embodiment, after the client device obtains permission associated link 310, the client device may utilize the link in a web browser to request the page and/or document associated with permission associated link 310. In an embodiment, permission associated link 310 may include a page address and/or may be an HTTP request. Utilizing permission associated link 310 may cause permission associated link 310 to appear in document interaction GUI 300.

If a document generation system receives an access request, document generation system may return to the requesting client device one or more files, such as, for example, an HTML, file, images, flash files, JavaScript files, CSS files, audio files, video files, and/or other files used to generate document interaction GUI 300.

Based on the files instantiated by the document generation system, document interaction GUI 300 may include document interface 320 and/or chat panel 330. In an embodiment, document interface 320 may display the document stored in the document generation system. Document interface 320 may allow a client device displaying document interaction GUI 300 to interact with the document. The available document interactions may depend on the permission associated link 310 utilized to access the document. For example, if permission associated link 310 is associated with an editor permission, allowing a client device to edit the document, the client device may edit the document using document interface 320. For example, a client device may utilize computer peripherals, such as, for example, a mouse, keyboard, and/or touch screen display to manipulate the document displayed in document interface 320. In an embodiment, the client device may transmit these edits to the document generation system instantiating the document.

In an embodiment, if permission associated link 310 is associated with a viewer permission, allowing a client device to view the document, the client device may view the document using document interface 320. In an embodiment, depending on the viewer permission associated with permission associated link 310, document interface 320 may display portions of the document. In an embodiment, the viewer permission may allow the client device to navigate the full document using document interface 320. In an embodiment, the viewer permission may limit the portions of the document that the client device may navigate. Utilizing document interface 320, a client device may interact with a document.

Figure 3B:
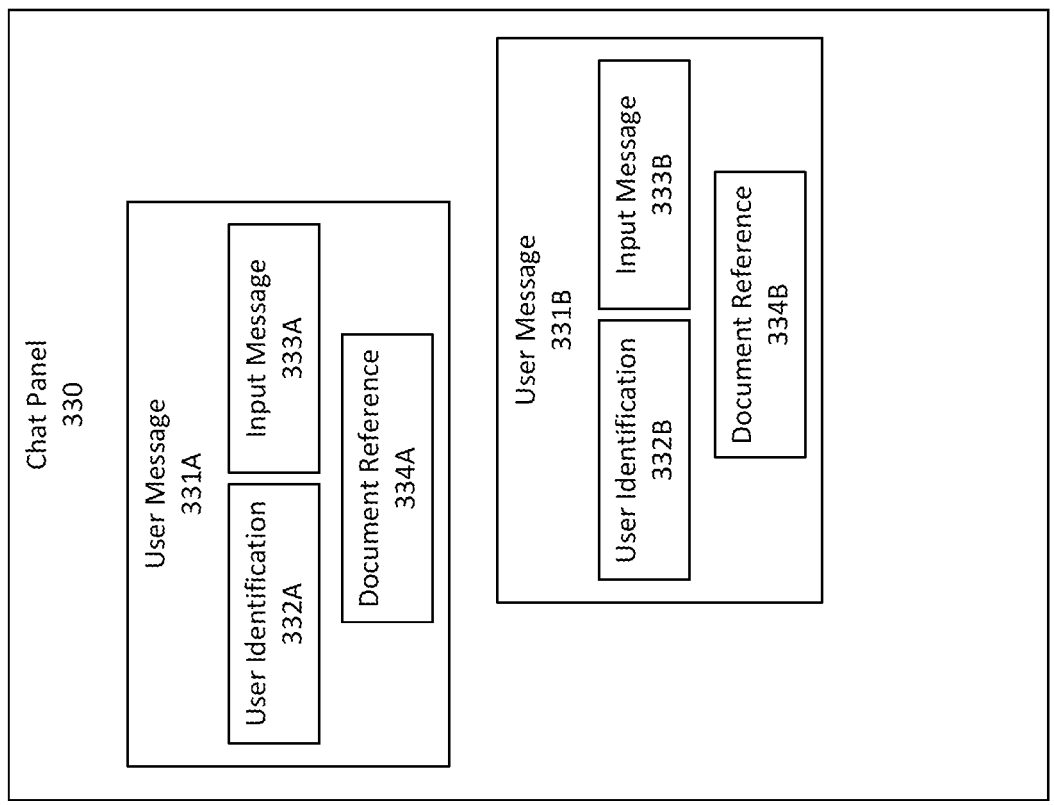
FIG. 3B is a screen display of a chat panel, according to some embodiments.

Chat panel 330 will be described with reference to FIG. 3B. FIG. 3B is a screen display of a chat panel 330, according to some embodiments. Chat panel 330 may be a portion of document interaction GUI 300. In an embodiment, permission associated link 310 may allow commenting and/or interacting with chat features associated with the document. In an embodiment, the commenting and/or chat interaction may be coupled with an editor and/or viewer permission.

Chat panel 330 may be one or more sections of document interaction GUI 300 and/or may be associated with a document displayed in document interface 320. A document generation system may instantiate chat panel 330, receive comments and/or chat messages from a client device via chat panel 330, and/or maintain the comments and/or chat messages in a repository. The client device may utilize chat panel 330 to transmit comments and/or chat messages to the document generation system. In an embodiment, the document generation system may associate permission associated link 310 with a comment and/or chat message received at chat panel 330.

In an embodiment, client devices may submit input messages 333 to chat panel 330. In an embodiment, input message 333 may include a textual message, image message, audio message, and/or video message. In an embodiment, if a client device is equipped with an input text peripheral, such as for example, a keyboard and/or a touch screen display, the client device may receive a textual input message 333. In an embodiment, if a client device is equipped with a camera, the client device may capture an image and/or video as an input message 333. In an embodiment, if a client device is equipped with a microphone, the client device may capture an audio message as an input message 333. In an embodiment, chat panel 330 may display predefined input messages 333, allowing a client device to send a selection command as an input message 333.

In an embodiment, when an input message 333 is received at chat panel 330, the client device displaying document interaction GUI 300 may transmit input message 333 to the document generation system. In an embodiment, document generation system may store input message 333 and/or generate user message 331, associating input message 333 with a user identification 332 and/or a document reference 334. In an embodiment, the client device may generate the user message 331 including the input message 333, user identification 332, and/or document reference 334. If the client device generates user message 331, the client device may transmit the message to the document generation system.

In an embodiment, to construct user message 331, the client device and/or the document generation system receiving input message 333 may associate user identification 332 and/or document reference 334 to input message 333. User identification 332 may be an identification of the user submitting input message 333. For example, user identification 332 may be permission associated link 310, a portion of permission associated link 310, and/or an identification defined by the client device, such as, for example, a selected display name submitted with input message 333. In an embodiment, user identification 332 may include a location-based identification and/or a time-based identification, such as, for example, a time stamp associated with the submission of input message 333.

Document reference 334 may be a parameter related to the document associated with permission associated link 310. Document reference 334 may refer to a portion of the document related to input message 333. For example, the document generation system may generate a presentation, including several presentation slides, and permission associated link 310 associated with the presentation. The document generation system may transmit the link to a client device, allowing the client device to access document interaction GUI 300 and interact with the slides of the presentation. If the document generation system receives an input message 333 from a client device while a slide is displayed on document interaction GUI 300, the document generation system may associate the slide number of the displayed slide with the input message 333. Document reference 334 may include the displayed slide number. In an embodiment where the document is a text document including one or more pages, if the document generation system receives an input message 333 from a client device while a page is displayed on document interaction GUI 300, the document generation system may associate the page number of the displayed page with the input message 333. Document reference 334 may include the displayed page number.

In an embodiment, the document generation system may associate user message 331 to the document associated with permission associated link 310. When another client device accesses the document, the client device may display a separate instance of chat panel 330, which may display the stored user message 331. For example, a first client device may be associated with user message 331A. A second client device may view user message 331A and/or may submit input message 333B to generate user message 331B.

In an embodiment, chat panel 330 may include a notification feature to alert users of new user messages 331. For example, after a client device accesses a document with an associated user message 331, the document generation system may transmit to the client device a notification indicating that a new user message 331 has been associated with the document that the client device has not previously displayed. This notification may be a user message 331 and may include an input message 333, user identification 332, and/or document reference 334. In an embodiment, the notification may include different coloring among different user messages 331, an audio tone, and/or the presence of a separate display element displayed on document interaction GUI 300.

Figure 4A:
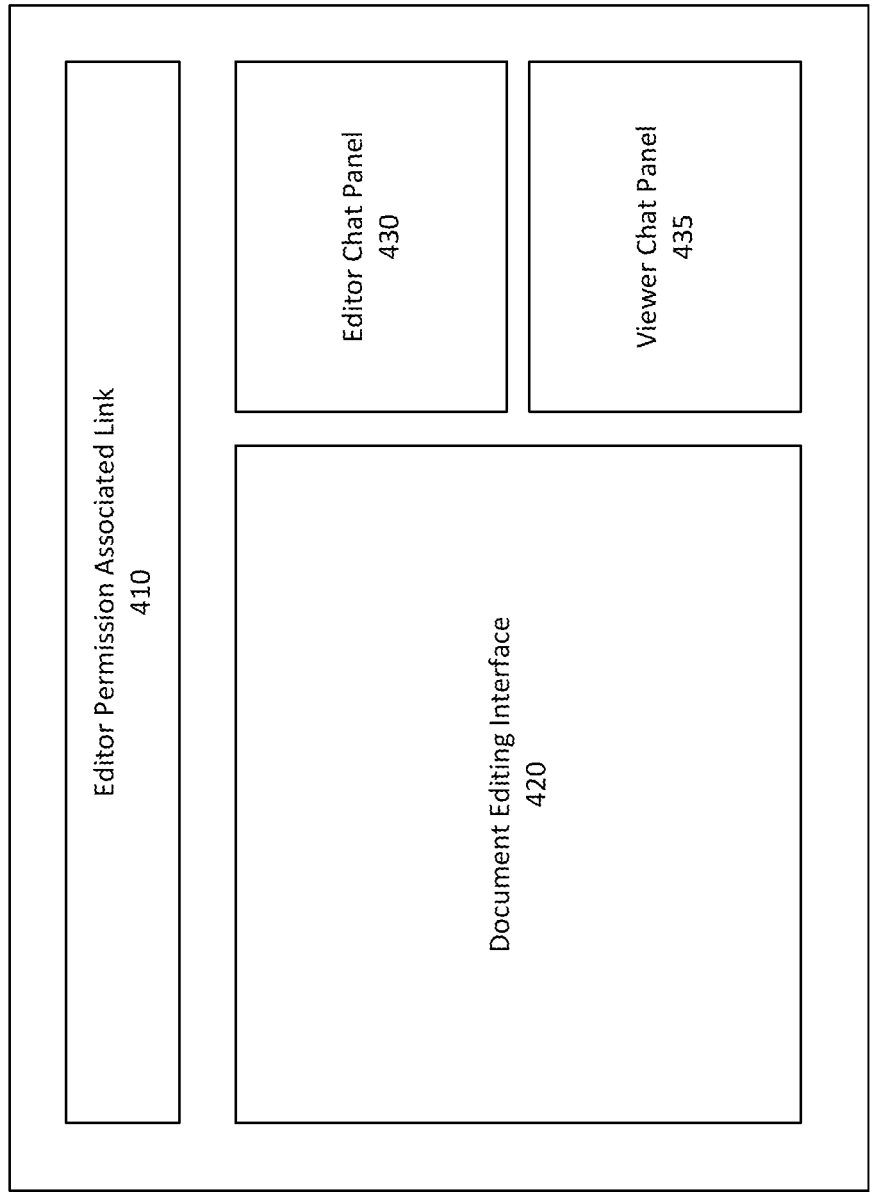
FIG. 4A is a screen display of an editor enabled graphical user interface, according to some embodiments.
Figure 4B:
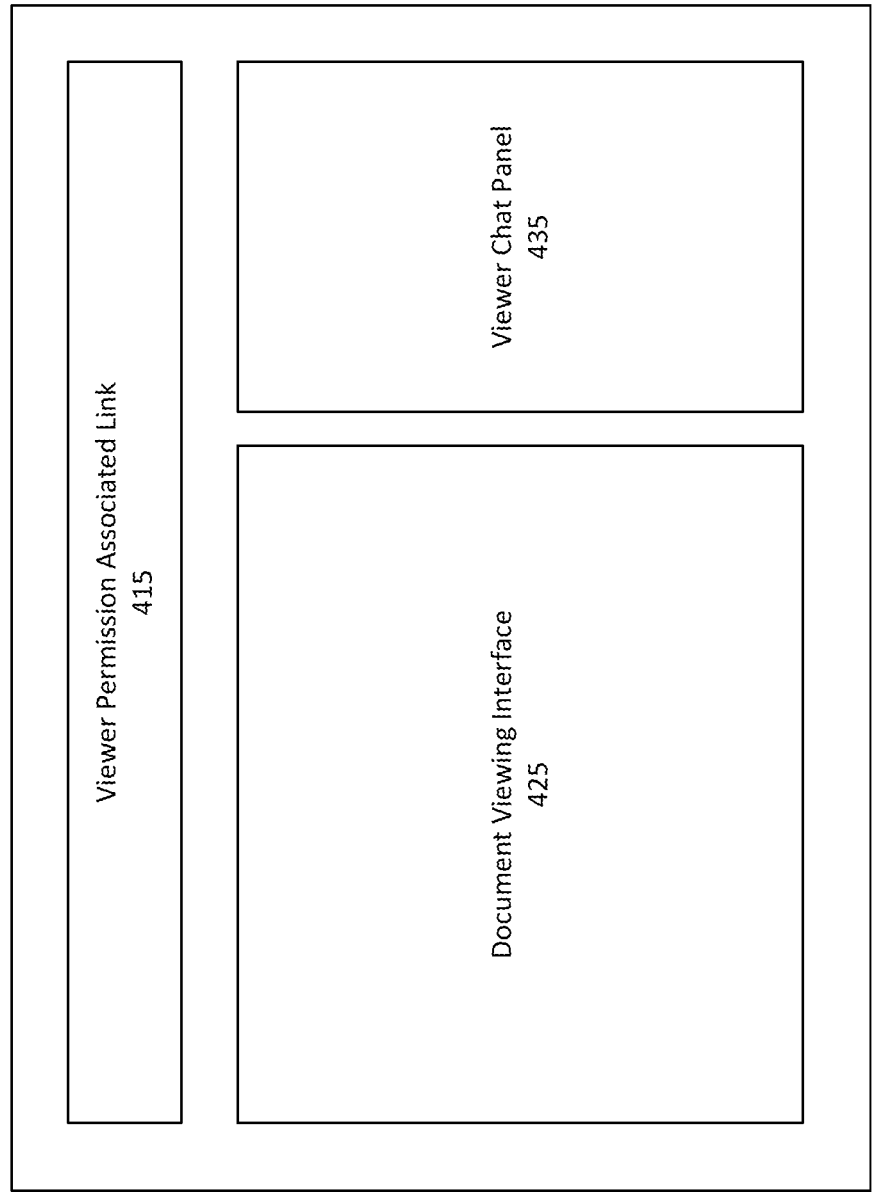
FIG. 4B is a screen display of a viewer enabled graphical user interface, according to some embodiments.

FIG. 4A is a screen display of an editor enabled graphical user interface (GUI) 400, according to some embodiments. In an embodiment, editor enabled GUI 400 may display an editor permission associated link 410, document editing interface 420, editor chat panel 430 and viewer chat panel 435. FIG. 4B is a screen display of a viewer enabled graphical user interface (GUI) 405, according to some embodiments. In an embodiment, viewer enabled GUI 405 may display a viewer permission associated link 415, document viewing interface 425, and viewer chat panel 435. Editor enabled GUI 400 and viewer enabled GUI 405 will be discussed in conjunction to demonstrate contrasting embodiments.

A document generation system may instantiate editor enabled GUI 400 and/or provide access to editor enabled GUI 400 to a client device. The document generation system may also instantiate viewer enabled GUI 405 and/or provide access to viewer enabled GUI 405 to a client device. Editor enabled GUI 400 and/or viewer enabled GUI 405 may be developed using an application programming interface (API).

In an embodiment, the document generation system may transmit editor permission associated link 410 to a first client device, allowing the first client device to access and/or edit a document. The document generation system may associate editor permission associated link 410 with editor permissions. When the first client device accesses editor permission associated link 410, editor enabled GUI 400 may be displayed on the first client device, allowing the first client device to view and/or edit the document.

In an embodiment, the document generation system may transmit viewer permission associated link 415 to a second client device, allowing the second client device to view a document or a view a portion of the document. The document generation system may associate viewer permission associated link 415 with viewer permissions. When the second client device accesses viewer permission associated link 415, viewer enabled GUI 405 may be displayed on the second client device, allowing the second client device to view the document.

Document editing interface 420 may be a portion of editor enabled GUI 400. In an embodiment, document editing interface 420 may display a document and/or allow editing of the document. This interaction may occur in a manner similar to the editing features described with reference to document interface 320 of FIG. 3A.

Document viewing interface 425 may be a portion of viewer enabled GUI 405. In an embodiment, document viewing interface 425 may display a document and/or portions of the document. Viewing the document may occur in a manner similar to the viewing permission features described with reference to document interface 320 of FIG. 3A.

In an embodiment, if a client device has accessed editor permission associated link 410 to view editor enabled GUI 400, the client device may also display editor chat panel 430 and viewer chat panel 435. In an embodiment, editor chat panel 430 may receive and/or display user messages sent from other client devices that have accessed an editor permission associated link 410. For example, if a first client device has accessed a first editor permission associated link 410 and has generated an input message related to the underlying document, a second client device that has accessed a second editor permission associated link 410 may view the input message generated by the first client device. In this embodiment, client devices with access to an editor permission associated link 410 may communicate, adding comments and notes concerning the document in editor chat panel 430.

In contrast, in an embodiment, viewer chat panel 435 may differ from editor chat panel 430. Viewer chat panel 435 may display user messages and/or input messages related to the document from client devices that have accessed a viewer permission associated link 415 as displayed in FIG. 4B. In an embodiment, viewer enabled GUI 405 may display viewer chat panel 435 but may not display editor chat panel 430. In an embodiment, a client device that utilizes viewer permission associated link 415 may not view editor chat panel 430. In an embodiment, this configuration allows a client device with access to editor permission associated link 410 to view user messages and/or input messages from a client device having access to viewer permission associated link 415. In an embodiment, a document editor may view viewer comments regarding the document while the viewers may not view editor comments. In an embodiment, this configuration allows editors to communicate privately using editor chat panel 430 without revealing the communications to a viewer having viewer permissions. This configuration may allow editors to view viewer comments using viewer chat panel 435. In an embodiment, editor permission associated link 410 may allow an editor and/or a client device to submit input messages and/or user messages to both editor chat panel 430 and viewer chat panel 435. In this configuration, a client device utilizing editor permission associated link 410 may send communications to client devices using viewer permission associated link 415.

In an embodiment, while FIG. 4A displays editor chat panel 430 and viewer chat panel 435, editor enabled GUI 400 may display more than one copy of editor chat panel 430 and viewer chat panel 435. For example, the document generation system may instantiate multiple editor chat panels and/or may segregate users of editor permission associated link 410 into different chat panel categories. In an embodiment, users subscribed to a chat panel may communicate with other users also subscribed to the same chat panel. In an embodiment, viewer chat panels 435 may also be segregated into multiple viewer chat panel 435. A user with access to viewer permission associated link 415 may be grouped with other users of viewer permission associated link 415. In an embodiment, a user accessing editor permission associated link 410 may also view one or more viewer chat panels 435.

Figure 5:
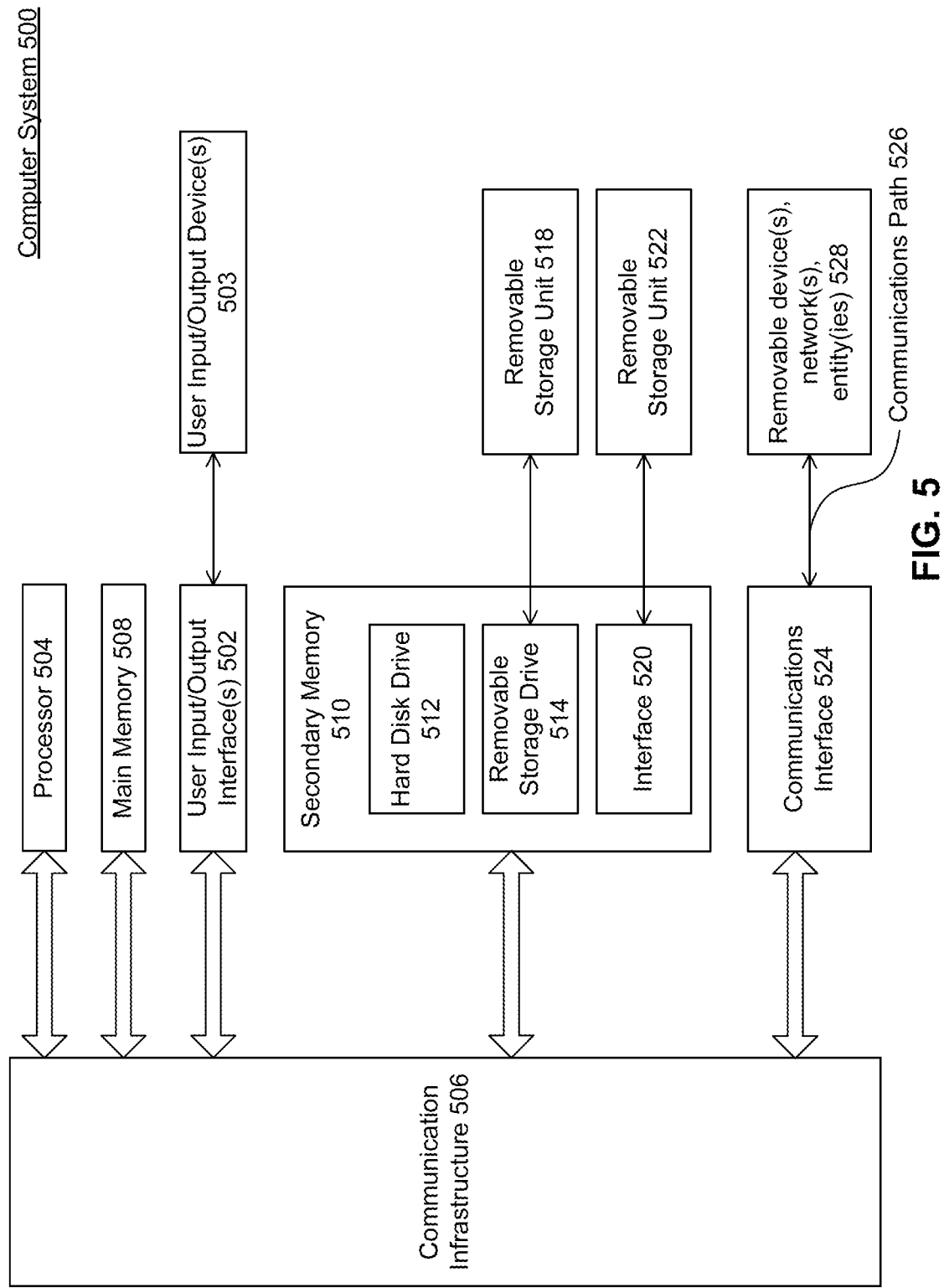
FIG. 5 is an example computer system useful for implementing various embodiments.

FIG. 5 is an example computer system 500 useful for implementing various embodiments. Various embodiments of the disclosure may be implemented, for example, using one or more computer systems, such as computer system 500 shown in FIG. 5. One or more computer systems 500 (or portions thereof) can be used, for example, to implement document generation system 110 and/or 210 of FIGS. 1 and 2.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communication path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments using data processing devices, computer systems and/or computer architectures other than that shown in FIG. 5. In particular, embodiments may operate with software, hardware, and/or operating system implementations other than those described herein.

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the disclosure or the appended claims in any way.

While the disclosure has been described herein with reference to exemplary embodiments for exemplary fields and applications, it should be understood that the scope of the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of disclosed inventions should not be limited by any of the above-described exemplary embodiments, but should be defined only in accordance with the following claims and their equivalents.

What is claimed is:

1. A system, comprising:
   a memory; and
   one or more processors, coupled to the memory, configured to perform operations comprising:
   receiving, from a client device, a request to access a document associated with a link, wherein:
   a permission for the client device to access the document is embedded in the link:
   the permission includes a first access permission and a second access permission different from the first access permission;
   the first access permission comprises displaying a first chat panel including a first comment to the document and a second chat panel including a second comment to the document; and
   the second access permission comprises concealing the first chat panel and displaying the second chat panel; and
   responsive to receiving the request to access the document associated with the link:
   causing display, on the client device, of the document concurrently with the first and second chat panels associated with the document responsive to the link having the first access permission, wherein the first chat panel includes at least one of messages from users associated with the document or edits made to the document; and
   causing display, on the client device, of the document while concealing the first chat panel and displaying the second chat panel responsive to the link having the second access permission.

2. The system of claim 1, wherein the operations further comprise causing concurrent display, on the client device, of the document and a plurality of chat panels associated with the document responsive to the link having a third access permission different from the first and second access permissions, wherein the plurality of chat panels includes the first chat panel.

3. The system of claim 1, wherein the operations further comprise:
   receiving, from a user having the first access permission, a comment to the document via the first chat panel; and
   storing the comment in a database.

4. The system of claim 3, wherein the operations further comprise generating a notification in response to receiving the comment.

5. The system of claim 1, wherein the operations further comprise granting rights to edit the document responsive to the link having the first access permission.

6. The system of claim 5, wherein the operations further comprise:
   receiving, from a user having the first access permission, an edit to the document; and
   storing the edit in a database.

7. A non-transitory computer-readable device having instructions stored thereon that, when executed by at least one computing device, cause the at least one computing device to perform operations comprising:
   receiving, from a client device, a request to access a document associated with a link, wherein:
   a permission for the client device to access the document is embedded in the link;
   the permission includes a first access permission and a second access permission different from the first access permission;
   the first access permission comprises displaying a first chat panel including a first comment to the document and a second chat panel including a second comment to the document; and
   the second access permission comprises concealing the first chat panel and displaying the second chat panel; and
   responsive to receiving the request to access the document associated with the link:
   causing display, on the client device, of the document concurrently with the first and second chat panels associated with the document responsive to the link having the first access permission, wherein the first chat panel includes at least one of messages from users associated with the document or edits made to the document; and
   causing display, on the client device, of the document while concealing the first chat panel and displaying the second chat panel responsive to the link having the second access permission.

8. The non-transitory computer-readable device of claim 7, wherein the operations further comprise causing concurrent display, on the client device, of the document and a plurality of chat panels associated with the document responsive to the link having a third access permission different from the first and second access permissions, wherein the plurality of chat panels includes the first chat panel.

9. The non-transitory computer-readable device of claim 7, the operations further comprising:
   receiving, from the client device having the first access permission, a comment to the document via the first chat panel; and
   storing the comment in a database.

10. The non-transitory computer-readable device of claim 9, the operations further comprising generating a notification in response to receiving the comment.

11. The non-transitory computer-readable device of claim 7, the operations further comprising granting rights to edit the document responsive to the link having the first access permission.

12. The non-transitory computer-readable device of claim 11, the operations further comprising:
   receiving, from the client device having the first access permission, an edit to the document; and
   storing the associated edit in a database.

13. The non-transitory computer-readable device of claim 7, the operations further comprising receiving a request to convert the permission of the link from the first access permission to the second access permission or from the second access permission to the first access permission.

14. A computer-implemented method, comprising:
  receiving, from a client device, a request to access a document associated with a link wherein:
    a permission for the client device to access the document is embedded in the link;
    the permission includes a first access permission and a second access permission different from the first access permission;
    the first access permission comprises displaying a first chat panel including a first comment to the document and a second chat panel including a second comment to the document; and
    the second access permission comprises concealing the first chat panel and displaying the second chat panel; and
  responsive to receiving the request to access the document associated with the link:
    causing display, on the client device, of the document concurrently with the first and second chat panels associated with the document responsive to the link having the first access permission, wherein the first chat panel includes at least one of messages from users associated with the document or edits made to the document; and
    causing display, on the client device, of the document while concealing the first chat panel and displaying the second chat panel responsive to the link having the second access permission.

15. The computer-implemented method of claim 14, wherein the method further comprises causing concurrent display, on the client device, of the document and a plurality of chat panels associated with the document responsive to the link having a third access permission different from the first and second access permissions, wherein the plurality of chat panels includes the first chat panel.

16. The computer-implemented method of claim 14, further comprising:
  receiving, from the client device having the first access permission, a comment to the document via the first chat panel; and
  storing the comment in a database.

17. The computer-implemented method of claim 16, further comprising generating a notification in response to receiving the comment.

18. The computer-implemented method of claim 14, further comprising granting rights to edit the document responsive to the link having the first access permission.

19. The computer-implemented method of claim 18, further comprising:
  receiving, from the client device having the first access permission, an edit to the document; and
  storing the edit in a database.

20. The computer-implemented method of claim 14, further comprising receiving a request to convert the permission of the link from the first access permission to the second access permission or from the second access permission to the first access permission.

* * * * *

UNITED STATES PATENT AND TRADEMARK OFFICE
CERTIFICATE OF CORRECTION

| | |
|---|---|
| PATENT NO. | : 11,698,983 B2 |
| APPLICATION NO. | : 16/952451 |
| DATED | : July 11, 2023 |
| INVENTOR(S) | : Hamlin et al. |

It is certified that error appears in the above-identified patent and that said Letters Patent is hereby corrected as shown below:

In the Specification

In Column 11, Line 34, delete "HTML," and insert -- HTML --, therefor.

In the Claims

In Column 17, Claim 1, Line 32, delete "link:" and insert -- link; --, therefor.

In Column 19, Claim 14, Line 8, delete "link" and insert -- link, --, therefor.

Signed and Sealed this
Fifteenth Day of August, 2023

Katherine Kelly Vidal
*Director of the United States Patent and Trademark Office*